Patented Aug. 5, 1952

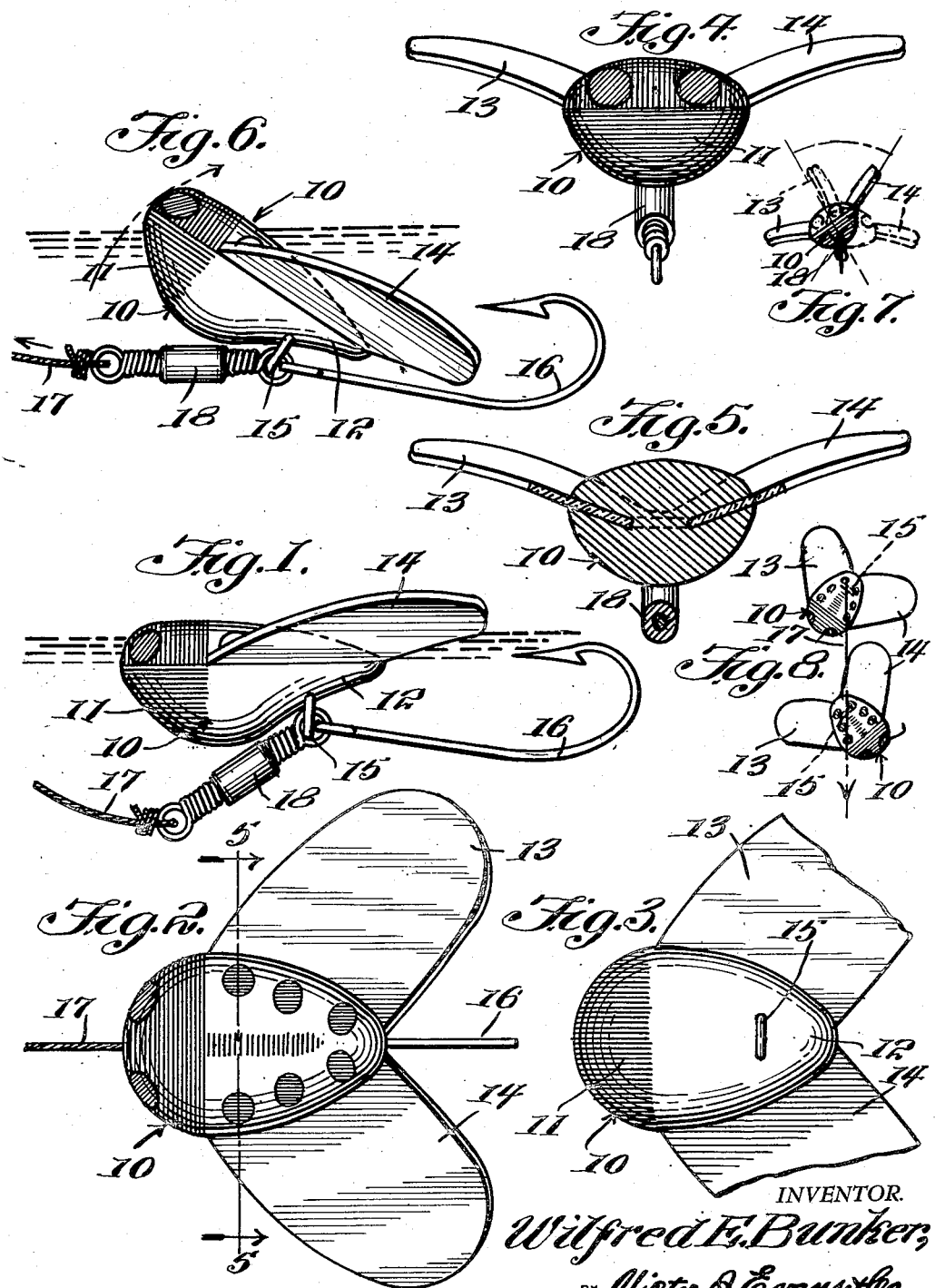

2,605,573

UNITED STATES PATENT OFFICE 2,605,573

FISH LURE

Wilfred E. Bunker, Aberdeen, Wash.

Application November 1, 1949, Serial No. 124,876

1 Claim. (Cl. 43—42.36)

This invention relates to fishing equipment, and more particularly to an artificial fish lure.

The object of the invention is to provide a fish lure which will simulate live bait when pulled through the water.

Another object of the invention is to provide a fish lure which flutters or wiggles when drawn through the water, the fish lure being adaptable for lake or stream fishing, slow trolling, or drift fishing.

A further object of the invention is to provide a fish lure which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the fish lure showing its position as it lands in the water according to the present invention;

Figure 2 is a top plan view of the fish lure;

Figure 3 is a bottom plan view of the fish lure, with the fishing line and fishhook removed, and with parts of the wings broken away;

Figure 4 is a front elevational view of the fish lure;

Figure 5 is a sectional view taken on the line 5—5 of Figure 2;

Figure 6 is a view showing the lure in its raised or lifted position as it is pulled through the water;

Figure 7 is a front elevational view illustrating the fluttering action of the lure;

Figure 8 is a top plan view showing the fluttering or wiggling action of the lure as it is drawn through the water.

Referring in detail to the drawings, the numeral 10 designates a body which may be fabricated of any suitable material, such as a light plastic, and the body 10 is buoyant. The lower front portion of the body 10 is cut away, as at 11, to define a breast. Further, the lower rear portion of the body 10 is cut away to define a tail 12.

The body 10 is preferably painted in bright colors so that its external appearance is that of a live bait, whereby fish will be readily attracted thereto.

Projecting from the opposite sides of the body 10 and secured thereto is a pair of upwardly sloping, rearwardly-inclined wings 13 and 14. The wings 13 and 14 may be made of any suitable material, such as a rigid plastic material.

Arranged rearwardly of the breast of the body 10 is an attaching eye 15, the eye 15 being secured to the bottom rear portion of the body 10. A fishhook 16 is adapted to be connected to the eye 15, and the end of a swivel 18 may also be connected to the eye 15, the other end of the swivel 18 being connected to an end of a fishing line 17.

From the foregoing, it is apparent that a fish lure has been provided which includes a body 10 that has an external configuration simulating live bait. When the lure is thrown or cast into the water, it assumes the position shown in Figure 1, such figure showing the body 10 flat on the surface. Then, as the fish lure is drawn or pulled through the water by the fishing line 17, the body 10 assumes the position shown in Figure 6. Also, due to the shape of the body 10, and due to the positioning of the eye 15 and the arrangement of the wings 13 and 14, the fish lure will flutter or wiggle from side to side, as shown in Figures 7 and 8, as the lure is drawn through the water, whereby live bait will be simulated, so that fish will be attracted to the lure.

Thus, it will be seen that the resistance of the water causes the lure to wiggle in an irresistible manner as the lure is drawn through the water. The wings 13 and 14 help to stabilize the fish lure and the resistance of the water against the upcurved breast of the light-weight body 10 causes the lure to climb in the water as the lure is pulled through the body of water. Initially, when the lure is cast onto the water, it is in the position shown in Figure 1, and after the lure starts its movement through the water, the lure assumes the position shown in Figure 6, Figure 6 showing the body 10 in its raised position. For drift fishing, a small spinner or a split shot may be added to the front of the lure.

Thus, it is apparent that the lure of the present invention will wiggle or flutter as it is drawn through the water and is attractive to fishermen as well as to fish. The lure can be used on either lake or stream fishing, can be used for cast or retrieve fishing, slow trolling, drift fishing, in the ripples or on the bottom of the stream. Further, the fly plug of the present invention is adapted to be manufactured or produced with speed and economy, since the body and wings can be molded in one piece from light-weight plastic material. By arranging the eye 15 as shown and described, and by cutting away the lower front portion of the body 10, the body 10 will be lifted as it is drawn through the water. The shape of the wings 13 and 14 act as a stabilizer and cause the lure to right itself when cast in the water.

What is claimed is:

A fish lure comprising a buoyant body fabricated of light-weight plastic and having an external configuration simulating live bait, said body having its lower front portion cut away to define an inclined breast, and its lower rear portion cut away to define a tail, an attaching eye arranged rearwardly of the breast and secured to the bottom of said body centrally of the tail portion, said eye being adapted to be attached to one eye of swivel connection, a fishhook attached to the same eye of the swivel connection and a fishing line attached to the other eye of said swivel connection, and a pair of opposed rigid rearwardly inclined and upwardly sloping wings secured to the sides of said body rearwardly of the inclined breast portion.

WILFRED E. BUNKER.

REFERENCES CITED

The following references are of record in the file of this patent:

UNITED STATES PATENTS

| Number | Name | Date |
| --- | --- | --- |
| 1,309,061 | Cassedy | July 8, 1919 |
| 1,590,529 | Larzelere et al. | June 29, 1926 |
| 2,112,180 | Stoddard | Mar. 22, 1938 |
| 2,437,549 | Pecher | Mar. 9, 1948 |
| 2,495,021 | Pruden | Jan. 17, 1950 |
| 2,502,879 | Nikander | Apr. 4, 1950 |